United States Patent
Schindler et al.

(10) Patent No.: US 7,060,760 B2
(45) Date of Patent: Jun. 13, 2006

(54) SILANE-TERMINATED POLYDIORGANOSILOXANE URETHANE COPOLYMER

(75) Inventors: Wolfram Schindler, Tüssling (DE); Oliver Schäfer, München (DE); Volker Stanjek, München (DE); Bernd Pachaly, Mehring (DE)

(73) Assignee: Consortium fur elektrochemische Industrie GmbH, Munich (DE)

( * ) Notice: Subject to any disclaimer, the term of this patent is extended or adjusted under 35 U.S.C. 154(b) by 115 days.

(21) Appl. No.: 10/471,955

(22) PCT Filed: Feb. 14, 2002

(86) PCT No.: PCT/EP02/01581

§ 371 (c)(1),
(2), (4) Date: Sep. 15, 2003

(87) PCT Pub. No.: WO02/077072

PCT Pub. Date: Oct. 3, 2002

(65) Prior Publication Data

US 2004/0087752 A1     May 6, 2004

(30) Foreign Application Priority Data

Mar. 22, 2001   (DE) ................. 101 13 980

(51) Int. Cl.
*C08G 77/458*   (2006.01)
*C08G 77/455*   (2006.01)

(52) U.S. Cl. .......... 525/474; 528/28; 528/33; 528/38

(58) Field of Classification Search .......... 528/28, 528/33, 38; 525/474
See application file for complete search history.

(56) References Cited

U.S. PATENT DOCUMENTS

| | | | | |
|---|---|---|---|---|
| 5,356,706 A | * | 10/1994 | Shores | 428/352 |
| 5,750,630 A | * | 5/1998 | Sengupta | 528/59 |
| 6,313,335 B1 | * | 11/2001 | Roberts et al. | 556/419 |
| 6,750,309 B1 | * | 6/2004 | Chu et al. | 528/28 |

FOREIGN PATENT DOCUMENTS

| | | |
|---|---|---|
| EP | 0 250 248 | 6/1987 |
| WO | WO 95/21206 | 1/1995 |
| WO | WO 96/34030 | 4/1996 |

OTHER PUBLICATIONS

J. Kozakiewicz, "Polysiloxaneurethanes: New Polymers for Potential Coating Applications," Prog. Org. Coat, 1996 (27), pp. 123-131.

I. Yilgor et al., "Segmented Organosiloxane Copolymers," Polymer, 1984 (25), p. 1800-1807.

* cited by examiner

*Primary Examiner*—Jeffrey B. Robertson
(74) *Attorney, Agent, or Firm*—Brooks Kushman P.C.

(57) ABSTRACT

Curable, silane-terminated polydiorganosiloxane-urethane copolymers exhibit the beneficial properties of isocyanate-terminated polysiloxane-urethane copolymers without the detriments associated with free isocyanate groups.

21 Claims, No Drawings

SILANE-TERMINATED POLYDIORGANOSILOXANE URETHANE COPOLYMER

BACKGROUND OF THE INVENTION

1. Field of the Invention

The invention relates to silane-terminated hybrid polymers based on polydiorganosiloxane-urethane copolymers having moisture-curing silane end groups, to a process for preparing them, and to their use.

2. Description of the Related Art

The properties of polyurethanes and silicone elastomers are complementary within wide ranges. The combination of both systems ought therefore to give access to materials having excellent properties. Polyurethanes stand out by virtue of their good mechanical strength, elasticity, and their very good adhesion and abrasion resistance. Silicone elastomers, on the other hand, possess excellent temperature, UV, and weathering stability. They retain their elastic properties at relatively low temperatures and therefore also have no tendency toward embrittlement. In addition they possess special water repellency and anti stick surface properties.

The combination of the advantages of both systems leads not only to new compounds having low glass transition temperatures, low surface energies, enhanced thermal and photochemical stabilities, low water absorption, and physiologically inert materials but also to materials in which the properties can be adjusted by the proportion and chemical composition of the silicone and polyurethane constituents.

Investigations have been conducted in order to overcome the poor phase compatibilities of the two systems. Producing polymer blends allowed sufficient compatibilities to be achieved only in a few specific cases. Not until the preparation of polydiorganosiloxane-urethane copolymers described in J. Kozakiewicz, Prog. Org. Coat., 1996 (27), 123 and of polydiorganosiloxane-urea copolymers, in I. Yilgör, Polymer, 1984 (25), 1800 was it possible to achieve this objective. The reaction of the polymer building blocks takes place latterly in accordance with a comparatively simple polyaddition, such as is employed for the preparation of polyurethanes. Starting materials used for the siloxane units are hydroxyalkyl-terminated polysiloxanes (siloxane-urethane copolymers) and aminoalkyl-terminated polysiloxanes (siloxane-urea copolymers). These form the soft segments in the copolymers, analogous to the polyethers in straight polyurethane systems. As hard segments the customary diisocyanates are used, and may also be modified by addition of short-chain diols, such as 1,4-butanediol for the purpose of achieving higher strengths. The reaction of the amino compounds with isocyanates is spontaneous and as a general rule does not require any catalyst. The reaction of hydroxy compounds is carried out by addition of catalysts—mostly tin compounds.

The silicone and isocyanate polymer building blocks are readily miscible within a wide range. The mechanical properties are determined by the ratio of the different polymer blocks (soft silicone segments and hard urethane/urea segments) and substantially by the diisocyanate used. In the case of the urea copolymers almost exclusively thermoplastic materials are obtained. As a result of the strong interactions of the hydrogen bonds between the urea units these compounds possess a defined melting or softening point. These interactions are much less pronounced in the urethane copolymers, and so these materials generally form highly viscous liquids.

For elastomers, seals, adhesives and sealants or antistick coatings, conventional polysiloxanes are employed in the form of thixotropic pastes. In order to attain the desired ultimate strengths, various means of curing the compositions have been developed, with the objective of fixing the desired structures and adjusting the mechanical properties. Generally, however, the polymers require blending through the addition of reinforcing additives, such as highly disperse silicas, for example, in order to attain sufficient mechanical properties.

In the case of the curing systems a distinction is made essentially between high-temperature-vulcanizing (HTV) systems and room-temperature-vulcanizing (RTV) systems. In the case of the RTV compositions there are both one-component (1K) and two-component (2K) systems. In the 2K systems the two components are mixed and thereby catalytically activated and cured. The curing mechanism and the catalyst required may differ. Curing is normally effected by peroxide crosslinking, by hydrosilylation by means of platinum catalysis or by silane condensation. A compromise has to be made between working time and cure time. The 1K systems cure exclusively by silane condensation with the ingress of atmospheric moisture. This curing mechanism is of interest for simple processing of the materials, as needed for adhesives and sealants. In the absence of moisture, the 1K systems are stable on storage for prolonged periods of time. Curing takes place primarily by way of condensation-crosslinking alkoxy-, acetoxy- or oximo-terminated compounds.

Conventional polyurethanes are employed analogously as with 1K systems or 2K systems. The 1K compositions cure by the contact of isocyanate-containing prepolymers with the atmospheric moisture. In this reaction the isocyanate group is broken into an amino group and carbon dioxide. The amino compound formed reacts immediately with further isocyanate. In the case of spray foams the carbon dioxide released is desirable for the generation of foam alongside the propellant gas, but in adhesives and sealants can lead to problems in application as a result of bubbling. A further disadvantage is the general need to set low viscosities for favorable processing. Since the polyurethane prepolymers usually exhibit very high viscosities, either processing must be carried out at relatively high temperature or monomers or short-chain oligomers must be added to the polymer in order to lower the viscosity.

A critical point is that the remaining free isocyanate groups, owing to their high reactivity, can also exhibit extreme irritant and toxic effects. Additionally, some amines which are formed from the monomeric isocyanates are suspected of being carcinogenic. Consequently, a residual monomer content or the addition of monomers may in future be problematic from standpoints of toxicology.

A multiplicity of investigations, therefore, are also concerned with the preparation of isocyanate-free polyurethane prepolymers. One very promising approach which has emerged is the preparation of silane-crosslinking prepolymers. In this case, isocyanate-containing prepolymers are generally reacted with aminosilanes. This produces silane-terminated polymers, in which the silane groups may carry further reactive substituents which crosslink on ingress of moisture, such as alkoxy, acetoxy or oximato groups. These materials are then cured in analogy to the silicones described above. With these polymers, however, it is necessary to obtain a compromise between the mechanical properties, determined largely by the molecular weight, and the associated viscosity. High molecular weights are important for good tensile strengths, but these systems possess very high viscosities and can be processed only at relatively high temperatures or as a result of the addition of solvents or plasticizers.

The mechanism of curing by silane condensation is known for polydiorganosiloxane-urea copolymers as well and is used for example in WO 96/34030 and EP-A-250 248 to produce special antistick coatings. Polymers of this kind can be synthesized only in solution or by coextrusion, since almost without exception the copolymers obtained are solid and possess thermoplastic properties prior to crosslinking. As a consequence they can be processed only at relatively high temperatures or by application from solution.

WO 95/21206 describes polyurethane copolymers which are terminated with hydrolyzable silanes and are prepared by reacting an isocyanate-terminated polyurethane-silicone-polyether prepolymer with diamine chain extender and amino silane in aqueous dispersion. These polyurethane copolymers can be processed only as a dispersion. The presence of water gives rise in numerous instances to processing problems, in connection with blending with water-sensitive formula constituents, for example, or else impairments during application, by shrinkage after drying.

SUMMARY OF THE INVENTION

The object was to provide polydiorganosiloxane-urethane copolymers which can be condensed by way of silane groups, have high molecular weights and, consequently, favorable mechanical properties, and exhibit good processing properties, such as low viscosity and freedom from solvent and water. These and other objects were achieved by silane-terminated polyorganosiloxane-urethane copolymers.

DETAILED DESCRIPTION OF THE PREFERRED EMBODIMENTS

The invention provides silane-terminated polydiorganosiloxane-urethane copolymer of the general formula 1

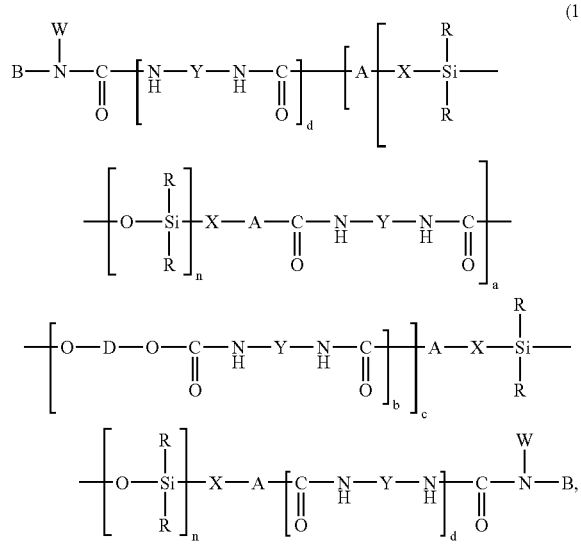

(1)

in which
R is a monovalent hydrocarbon radical optionally substituted by fluorine or chlorine and having 1 to 20 carbon atoms, X is an alkylene radical having 1 to 20 carbon atoms in which methylene units not adjacent to one another may have been replaced by groups —O—, A is an oxygen atom or an amino group —NR'—, R' is hydrogen or an alkyl radical having 1 to 10 carbon atoms, Y is a hydrocarbon radical optionally substituted by fluorine or chlorine and having 1 to 20 carbon atoms, D is an alkylene radical optionally substituted by fluorine, chlorine, $C_1$–$C_6$-alkyl or $C_1$–$C_6$-alkyl ester and having 1 to 700 carbon atoms, in which methylene units not adjacent to one another may have been replaced by groups —O—, —COO—, —OCO—, or —OCOO—, B is a radical of the general formula 2

(2),

Z is an alkylene radical having 1 to 10 carbon atoms, $R^1$ is a monovalent hydrocarbon radical optionally substituted by fluorine or chlorine and having 1 to 12 carbon atoms, R" is a moisture-reactive radical selected from $C_1$–$C_4$-alkoxy, $C_1$–$C_{20}$-acyl, $C_1$–$C_6$-alkylaminooxy, and $C_1$–$C_6$-alkyloximo radicals, W is a radical B or hydrogen, m is 0, 1 or 2, n is an integer from 1 to 2000, a is an integer of at least 1, b is 0 or an integer from 1 to 30, c is an integer from 1 to 30, and d is 0 or 1, with the proviso that, based on the sum of the urethane groups and urea groups, at least 30 mol % of urethane groups are present.

The silane-terminated polydiorganosiloxane-urethane copolymer of the general formula 1 exhibits high molecular weights in combination with good processing properties. The ultimate properties of the vulcanized polymers, such as the elasticity and the tensile strength of the polymers, are achieved through the proportion of urethane units and urea units and of the polydiorganosiloxane chains and, where present, of the alkylene chains D. The polymers of the invention possess properties such as are already known for the polyurethanes and polysiloxanes and for copolymers prepared therefrom. These properties are achieved with simultaneous silane condensation for the crosslinking and curing of the copolymers.

The silane-terminated polydiorganosiloxane-urethane copolymer of the general formula 1 represents a link between the isocyanate-crosslinking polyurethane compounds and the silane-crosslinking silicone systems. As a result of their specific construction, in contrast to existing polydiorganosiloxane-urea copolymers, a greatly extended field of use is possible, since processing properties, such as the viscosities, can be adjusted variably and with ease. This is of particular interest for a multiplicity of applications.

In particular through the use of urethane groups in lieu of the urea groups it is possible to achieve a marked reduction in viscosity. These tailor-made copolymers can be utilized free of water and solvent in applications such as, for example, in adhesives and sealants or for surface coatings for which a polymer of sufficiently low viscosity for processing at room temperature is desired.

R is preferably a monovalent hydrocarbon radical having 1 to 6 carbon atoms, in particular unsubstituted. Particularly preferred radicals R are methyl, ethyl, vinyl, and phenyl.

X is preferably an alkylene radical having 2 to 10 carbon atoms. Preferably the alkylene radical X is uninterrupted.

A is preferably an oxygen atom.

R' is preferably hydrogen or an alkyl radical having 1 to 3 carbon atoms, especially hydrogen.

A is preferably an oxygen atom.

Y is preferably a hydrocarbon radical having 3 to 13 carbon atoms which is preferably unsubstituted.

D is preferably an alkylene radical having at least 10, in particular at least 20 carbon atoms and not more than 100, in particular not more than 50 carbon atoms.

Likewise preferably D is a polyoxyalkylene radical, especially polyoxyethylene radical or polyoxypropylene radical, having at least 20, in particular at least 100 carbon atoms and not more than 800, in particular not more than 200 carbon atoms.

The radical D is preferably unsubstituted.

Z is preferably an alkylene radical having 1 to 6 carbon atoms, especially methylene, ethylene, and propylene.

$R^1$ is preferably an unsubstituted hydrocarbon radical having 1 to 4 carbon atoms, especially methyl or ethyl.

R" is preferably a methoxy, ethoxy or acetoxy radical.

n is preferably an integer of at least 3, in particular of at least 25 and preferably not more than 800, in particular not more than 400.

a is preferably an integer of not more than 10, in particular not more than 5.

If b is other than 0, b is preferably an integer of not more than 10, in particular not more than 5, with particular preference not more than 10.

c is preferably an integer of not more than 10, in particular not more than 5.

Based on the sum of the urethane groups and urea groups, the copolymer of the general formula 1 preferably contains at least 50 mol %, in particular at least 75 mol %, of urethane groups.

The copolymers of the general formula 1 can be prepared by reacting aminoalkyl- or hydroxyalkyl-terminated polydiorganosiloxanes of the general formula 3 with diisocyanates of

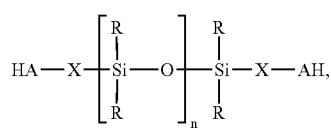 (3)

the general formula 4

 (4), and silanes of the general formula 5

 (5), and, if b is at least 1, additionally with α,ω-OH-terminated alkylenes of the general formula 6

 (6), where R, X, A, R', Y, D, B, Z, $R^1$, R", W, m, n, a, b, c, and d have the definitions indicated for the general formulae 1 and 2 and p is 1 and E is an isocyanate group or an amino group —NH R''', in which R''' is hydrogen or a monovalent hydrocarbon radical optionally substituted by fluorine or chlorine and having 1 to 12 carbon atoms, or P is 2 and E is an —NH radical.

The polydiorganosiloxanes of the general formula 3 are preferably substantially free from contaminations from higher polyfunctional and monofunctional constituents. In the polymer-forming reaction monofunctional constituents lead to unreactive end groups, which can no longer be reacted in the end termination by the silanes. Noncurable fractions lead generally to tacky products which can in some cases result in unwanted bleeding in the vulcanizate. Higher polyfunctional polydiorganosiloxanes are likewise unwanted, since in the reaction with diisocyanates they lead to the formation of crosslinking points which significantly increase the viscosity of the materials and in some cases even cause premature crosslinking of the material in the course of the synthesis.

The preparation of suitable aminoalkylpolydiorganosiloxanes is known, as is the preparation of hydroxyalkylpolydiorganosiloxanes, which is accomplished, for example, by hydrosilylating α,ω-dihydridopolydiorganosiloxanes with α,ω-dihydroxyalkylenes. Products of this kind are available commercially, such as the silicone oils Tegomer® H—Si 2111/2311/2711 from Goldschmidt AG, Germany or IM 15, IM 22 from Wacker-Chemie GmbH, Germany, for example.

Examples of diisocyanates of the general formula 4 are aliphatic compounds such as isophorone diisocyanate, hexamethylene 1,6-diisocyanate, tetramethylene 1,4-diisocyanate and methylenedicyclohexyl 4,4'-diisocyanate or aromatic compounds such as methylenediphenyl 4,4'-diisocyanate, toluene 2,4-diisocyanate, toluene 2,5-diisocyanate, toluene 2,6-diisocyanate, m-phenylene diisocyanate, p-phenylene diisocyanate, m-xylene diisocyanate, tetramethyl-m-xylene diisocyanate or mixtures of these isocyanates. An example of commercially available compounds are the diisocyanates of the DESMODUR® series (H, I, M, T, W) from Bayer AG, Germany. Preference is given to aliphatic diisocyanates in which Y is an alkylene radical, since these lead to materials of much lower viscosity which, moreover, also exhibit further improved UV stabilities, which is an advantage in the case of outdoor use of the polymers. Standard polyurethane systems with aromatic diisocyanates generally tend to yellow, with degradation of the polymers, and must be protected with greater effort against UV and light exposure.

The α,ω-OH-terminated alkylenes of the general formula 6 are preferably polyalkylenes or polyoxyalkylenes. For the same reasons as described for the polydiorganosiloxanes they ought to be substantially free from contaminations with polyoxyalkylenes having a functionality of one or of three or more. In this context it is possible to use polyether polyols, polytetramethylene diols, polyester polyols, polycaprolactone diols, but also α,ω-OH-terminated polyalkylenes based on polyvinyl acetate, polyvinyl acetate-ethylene copolymers, polyvinyl chloride copolymer, polyisobutyldiols. It is preferred here to used polyoxyalkyls, with particular preference polypropylene glycols. Compounds of this kind are available commercially as base materials, inter alia, for flexible polyurethane foams and for coating applications, with molecular masses Mn up to more than 10 000. Examples thereof are the BAYCOLL® polyether polyols and polyester polyols from Bayer AG, Germany or the Acclaim® polyether polyols from Lyondell Inc., USA. Monomeric α,ω-alkylenediols as well, such as ethylene glycol, propanediol, butanediol or hexanediol, can be used.

The silanes of the general formula 5 can carry reactive groups which react with isocyanate groups. Corresponding aminosilanes are preferred here. It is also possible, furthermore, to use isocyanato silanes, which can be reacted correspondingly with the OH and NH functions of the prepolymers. Alkoxy groups are used especially as reactive groups which cure under moisture.

Examples of suitable silanes are aminopropyltriethoxysilane, aminopropyltrimethoxysilane, aminopropylmethyldiethoxysilane, aminopropylmethyldimethoxysilane, aminopropyldimethylmethoxysilane, aminopropyldimethylethoxysilane, aminopropyltri(methylethylketoximo)silane, aminopropylmethyl-di(methylethylketoximo)silane, bis(triethoxysilylpropyl)amine, bis(trimethoxysilylpropyl)amine, aminomethyltriethoxysilane, aminomethyltrimethoxysilane, aminomethylmethyldiethoxysilane, aminomethylmethyldimethoxysilane, isocyanatopropyltriethoxysilane, isocyanatopropyltrimethoxysilane, isocyanatopropylmethyldiethoxysilane, isocyanatopropylmethyldimethoxysilane, isocyanatomethyltrimethoxysilane, isocyanatomethyltriethoxysilane, isocyanatomethylmethyldiethoxysilane, isocyanatomethylmethyldimethoxysilane, isocyanatomethyldimethylmethoxysilane, isocyanatomethyldimethylethoxysilane. Particular preference is given to the isocyanatodi- and -trimethoxysilanes, for the reaction of OH/NH-terminated prepolymers prepared from hydroxyalkylpolydiorganosiloxanes of the general formula 3 and polyethers of the general formula 6 with diisocyanates of the general formula 4. A synthesis by way of isocyanate-terminated prepolymers and aminosilanes of the general formula 5 is also possible. Preference is given to using isocyanatosilanes of the general formula 5 on account of the fact that their use results in the incorporation of urethane units, which lead to lower viscosities than urea units.

For the preparation of the copolymer of the general formula 1 it is possible to use aminoalkylpolydiorganosiloxane of the general formula 3 wherein A is an amino group —NR'—, or hydroxyalkylpolydiorganosiloxane of the general formula 3 wherein A is a hydroxy group —OH, or a mixture of amino- and hydroxyalkylpolydiorganosiloxane, with or without α,ω-OH-terminated alkylenes of the general formula 6.

For the preparation of the copolymer of the general formula 1 the proportion of NCO groups of the diisocyanates of the general formula 4 to the sum of the HA groups and HO groups of the hydroxyalkyl-terminated polydiorganosiloxanes of the general formula 3 and, where appropriate, α,ω-OH-terminated alkylenes of the general formula 6 used is preferably 0.5–1.5, in particular 0.8–1.2.

For the preparation of the copolymer of the general formula 1 the reaction temperature is preferably 0–150° C., in particular 20–100° C., and with particular preference 50–90° C.

The preparation of the above-described prepolymers and the subsequent end termination can take place both in solution and in bulk. What is essential here is that for the chosen polymer mixture under the reaction conditions the constituents are mixed optimally and homogeneously and that any phase incompatibility is prevented by means where appropriate of solubilizers. The preparation depends on the solvent used. If the proportion of the hard segments such as urethane units or urea units is large, then it maybe necessary to choose a solvent having a high solubility parameter, such as DMF for example. For the majority of syntheses THF has proven sufficiently suitable.

Preferably, all of the constituents are dissolved in an inert solvent. Particular preference is given to a synthesis without solvent.

In one preferred embodiment in the preparation of the copolymer of the general formula 1 the polydiorganosiloxane of the general formula 3 is reacted with the diisocyanate of the general formula 4 in an inert solvent, then with the dihydroxyalkylene of the general formula 6, and further, optionally, with further diisocyanates of the general formula 4, and then an end termination is carried out, in the case of OH-terminated prepolymers with an isocyanatosilane of the general formula 5 or, in the case of NCO-terminated prepolymers, with aminosilane of the general formula 5; the sequence of polydiorganosiloxane of the general formula 3 and dihydroxyalkylene of the general formula 6 can also be turned round.

In another preferred embodiment in the preparation of the copolymer of the general formula 1 the polydiorganosiloxane of the general formula 3 is first reacted with the diisocyanate of the general formula 4, then with the dihydroxyalkylene of the general formula 6 and further, optionally, with further diisocyanate of the general formula 4 and then an end termination is carried out, in the case of OH-terminated prepolymers with an isocyanatosilane of the general formula 5 or, in the case of NCO-terminated prepolymers, with aminosilane of the general formula 5; the sequence of polydiorganosiloxane of the general formula 3 and dihydroxyalkylene of the general formula 6 can also be turned round.

For the reaction without solvent the homogenization of the mixture is of critical importance for the reaction. Additionally, the polymerization can also be controlled by the choice of the reaction order in the case of a staged synthesis.

For better reproducibility the preparation ought generally to take place in the absence of moisture and under inert gas, normally nitrogen or argon, in order to prevent premature curing through hydrolysis of the silane groups. Moreover, the polymer building blocks employed ought to be baked out beforehand in order to remove low molecular mass impurities and traces of water.

As usual in the preparation of polyurethanes, the reaction takes place preferably by addition of a catalyst. Suitable catalysts for the preparation are dialkyltin compounds, such as dibutyltin dilaurate or dibutyltin diacetate, for example, or tertiary amines such as, for example, N,N-dimethylcyclohexanamine, 2-dimethylaminoethanol, and 4-dimethylaminopyridine.

The catalyst amounts are preferably 0.01–5% by weight, in particular 0.01–2%, with particular preference 0.01–0.5%, based in each case on the sum of the weights of diisocyanates of the general formula 4, hydroxyalkyl-terminated polydiorganosiloxanes of the general formula 3, silanes of the general formula 5, and, where used, α,ω-OH-terminated alkylenes of the general formula 6.

A variety of analytical methods can be used to monitor the reaction. The reaction is at an end when the NCO band can no longer be detected in the infrared spectrum.

Preferred applications of the silane-terminated polydiorganosiloxane-urethane copolymers of the general formula 1 are moisture-curing polymer in pure form, as a constituent in adhesives and sealants, as a basis for thermoplastic and vulcanized elastomers, for membranes, such as selectively gas-permeable membranes, as curable additives in polymer blends, or for coating applications, e.g., in antistick coatings, tissue-compatible coatings, flame-retardant coatings, and as biocompatible materials.

All of the above symbols of the above formulae have their definitions in each case independently of one another.

In the following examples, in each case unless specified otherwise, all amounts and percentages are by weight and all pressures are 0.10 MPa (abs.). All viscosities were determined at 20° C. The molecular masses were determined by means of GPC in toluene (0.5 ml/min) at 23° C. (column: PLgel mixed C+PLgel 100 A, detector: RI ERC7515).

EXAMPLE 1

Preparation of Silane-terminated PDMS-urethane Copolymer without Solvent a) Synthesis of the Copolymer by Reacting the Silicone Oil with Diisocyanate and Isocyanatosilane in One Stage:

392.0 g of bishydroxyhexylpolydimethylsiloxane (Mn=5600) are baked out under reduced pressure at 60° C. and blanketed with nitrogen, after which 250 ppm of dibutyltin dilaurate (corresponding to 50 ppm of tin) are added, and, at 80–85° C., reaction is carried out by rapid dropwise addition of 9.4 g of hexamethylene diisocyanate in 7.0 g of isocyanatopropyltriethoxysilane, and the mixture is stirred for three hours more. This gives a clear, colorless polymer having a viscosity of 46 000 mPas with an Mn of 23 600.

b) Synthesis of the Copolymer by Reacting the Silicone Oil With Diisocyanate and Aminosilane in One Stage:

252.0 g of bishydroxyhexylpolydimethylsiloxane (N=5600) are baked out under reduced pressure at 60° C. for one hour and blanketed with nitrogen, then 250 ppm of dibutyltin dilaurate (corresponding to 50 ppm of tin) are added, and, at 80–85° C., reaction is carried out by rapid dropwise addition of 13.3 g of isophorone diisocyanate and 6.6 g of aminopropyltriethoxysilane, and the mixture is stirred for three hours more. This gives a clear, colorless polymer having a viscosity of 28 000 mPas with an Mn of 13 400.

The copolymer contains 75 mol % urethane groups, based on the sum of the urethane groups and urea groups.

c) Synthesis of the Copolymer by Staged Reaction of Silicone Oil with Diisocyanate and Isocyanatosilane:

392.0 g of bishydroxyhexylpolydimethylsiloxane (Mn=5600) are baked out under reduced pressure at 60° C. for one hour, blanketed with nitrogen, 250 ppm of dibutyltin dilaurate (corresponding to 50 ppm of tin) are added, and then reaction is carried out with 9.4 g of hexamethylene diisocyanate at 80–85° C. for two hours. The prepolymer is then reacted for a further two hours with 5.8 g of isocyanatopropyltrimethoxysilane at 80–85° C. This gives a clear, colorless polymer having a viscosity of 43 700 mPas with an Mn of 18 500.

EXAMPLE 2

Preparation of Silane-terminated PDMS-urethane-urea Copolymer without Solvent a) 224.0 g of bishydroxyhexylpolydimethylsiloxane (Mn=5600) and 16.0 g of bisaminopropylpolydimethylsiloxane (Mn=1600) are baked out under reduced pressure at 60° C. for one hour and blanketed with nitrogen, then 250 ppm of dibutyltin dilaurate (corresponding to 50 ppm of tin) are added, and, at 80–85° C., reaction is carried out by rapid dropwise addition of 7.4 g of isophorone diisocyanate and 8.3 g of isocyanatopropyltriethoxysilane, and the mixture is stirred for three hours more. This gives a clear, colorless polymer having a viscosity of 18 000 mPas with an Mn of 10 200. The copolymer contains 85 mol % urethane groups, based on the sum of the urethane groups and urea groups.

b) 168.0 g of bishydroxyhexylpolydimethylsiloxane (Mn=5600) and 48.0 g of bisaminopropylpolydimethylsiloxane (Mn=1600) are baked out under reduced pressure at 60° C. for one hour and blanketed with nitrogen, then 250 ppm of dibutyltin dilaurate (corresponding to 50 ppm of tin) are added, and, at 80–85° C., reaction is carried out by rapid dropwise addition of 8.8 g of isophorone diisocyanate and 9.9 g of isocyanatopropyltriethoxysilane, and the mixture is stirred for three hours more. This gives a clear, colorless polymer having a viscosity of 150 000 mPas with an Mn of 8000. The copolymer contains 62 mol % urethane groups, based on the sum of the urethane groups and urea groups.

EXAMPLE 3

Preparation of Silane-terminated PDMS-urethane Copolymer with Solvent 392.0 g of bishydroxyhexylpolydimethylsiloxane (Mn=5600) are baked out under reduced pressure at 60° C. for one hour, blanketed with nitrogen, admixed with 200 ml of dry THF and 250ppm of dibutyltin dilaurate (corresponding to 50 ppm of tin), and then reacted with 9.4 g of hexamethylene diisocyanate at 65–70° C. for two hours. The prepolymer is then reacted for two hours more with 5.8 g of isocyanatopropyltrimethoxysilane. Evaporation of the solvent gives a clear, colorless polymer having a viscosity of 25 600 mPas with an Mn of 13 900.

EXAMPLE 4

Preparation of Silane-terminated PDMS-urethane-polyether Copolymers without Solvent a) Synthesis of the Prepolymer from Silicone Oil and Polyether by Reaction of a Mixture of the Two Polymer Building Blocks:

21.3 g of polypropylene glycol (Mn=425) are mixed with 211.8 g of bishydroxyhexylpolydimethylsiloxane (Mn=2000) and the mixture is baked out under reduced pressure at 60° C. for an hour and blanketed with nitrogen, then admixed with 250 ppm of dibutyltin dilaurate (corresponding to 50 ppm of tin) and, at 80–85° C., reacted by rapid dropwise addition with 16.7 g of isophorone diisocyanate, and stirred for two hours more. The OH-terminated prepolymer thus obtained is then reacted for two hours more with 37.1 g of isocyanatopropyltriethoxysilane at 80–85° C. This gives a clear, colorless polymer having a viscosity of 5000 mPas with an Mn of 11 000.

b) Synthesis of the Prepolymer from Silicone Oil and Polyether by Staged Reaction of the Two Polymer Building Blocks.

42.5 g of polypropylene glycol (Mn=425) are baked out under reduced pressure at 60° C. for an hour, blanketed with nitrogen, admixed with 250 ppm of dibutyltin dilaurate (corresponding to 50 ppm of tin), and then reacted with 44.4 g of isophorone diisocyanate at 80–85° C. for two hours. 106.4 g of bishydroxyhexylpolydimethylsiloxane (Mn=5600) (likewise baked out under reduced pressure at 60° C. for an hour beforehand) are added rapidly and the mixture is stirred at 80° C. for two hours more. The prepolymer is then reacted for two hours more with 49.5 g of isocyanatopropyltriethoxysilane at 80–85° C. This gives a clear, colorless polymer having a viscosity of 4100 mPas with an Mn of 12 000.

EXAMPLE 5

Preparation of Silane-terminated PDMS-urethane-polyether Copolymer with Solvent 10.6 g of polypropylene glycol (Mn=425) are baked out under reduced pressure at 60° C. for an hour, blanketed with nitrogen, admixed with 300 ml of dry THF and 250 ppm of dibutyltin dilaurate (corresponding to 50 ppm of tin), and then heated to boiling with 11.1 g of isophorone diisocyanate (65–70° C.) and reacted for two hours. 280.0 g of bishydroxyhexylpolydimethylsiloxane (Mn=5600) (likewise baked out under reduced pressure at 60° C. for an hour beforehand) are added rapidly and stirring is carried out in the boiling THF at 65–70° C. for a further two hours. The prepolymer is then reacted for two hours more with 12.4 g of isocyanatopropyltriethoxysilane. Evaporation of the solvent gives a clear, colorless polymer having a viscosity of 2400 mPas with an Mn of 10 500.

EXAMPLE 6

Preparation of a Silane-terminated PDMS-urea Copolymer with Solvent (Comparative Example)

a) 100.0 g of bisaminopropylpolydimethylsiloxane (Mn=1600, prepared in accordance with EP-A-250 248) are baked out under reduced pressure at 60° C. for an hour, blanketed with nitrogen, and admixed with 80 ml of dry THF, then 8.4 g of hexamethylene diisocyanate and 6.5 g of isocyanatopropyltriethoxysilane are metered in rapidly and the mixture is reacted at room temperature. It is then heated to boiling (65–70° C.) for one hour more. The THF is evaporated off under reduced pressure to give a colorless, slightly yellowish polymer having a softening range of 80–90° C.

b) 100.0 g of bisaminopropylpolydimethylsiloxane (Mn=7600, prepared in accordance with EP-A-250 248) are baked out under reduced pressure at 60° C. for an hour, blanketed with nitrogen, and admixed with 150 ml of dry THF, then 1.77 g of hexamethylene diisocyanate and 1.48 g of isocyanatopropyltriethoxysilane are metered in rapidly and the mixture is reacted at room temperature. It is then heated at boiling (65–70° C.) for one hour more. The THF is evaporated off under reduced pressure to give a colorless, slightly yellowish polymer having a softening range of 90–95° C.

What is claimed is:

1. A silane-terminated polydiorganosiloxane-urethane copolymer of the formula 1,

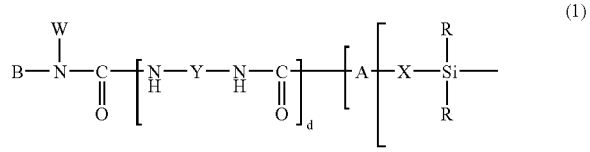

(1)

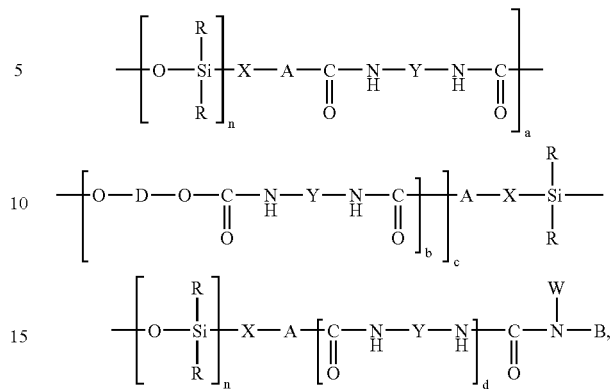

-continued wherein R is a monovalent hydrocarbon radical optionally substituted by fluorine or chlorine and having 1 to 20 carbon atoms, X is an alkylene radical having 1 to 20 carbon atoms in which non-adjacent methylene units are optionally replaced by —O—, A is an oxygen atom or an amino group —NR'—, R' is hydrogen or an alkyl radical having 1 to 10 carbon atoms, Y is a hydrocarbon radical optionally substituted by fluorine or chlorine and having 1 to 20 carbon atoms, D is an alkylene radical optionally substituted by fluorine, chlorine, $C_1$–$C_6$-alkyl or $C_1$–$C_6$-alkyl ester and having 1 to 700 carbon atoms, in which non-adjacent methylene units are optionally replaced by —O—, —COO—, —OCO—, or —OCOO—, B is a radical of the formula 2

(2), wherein

Z is an alkylene radical having 1 to 10 carbon atoms, $R^1$ is a monovalent hydrocarbon radical optionally substituted by fluorine or chlorine and having 1 to 12 carbon atoms, R" is a moisture-reactive radical selected from the group consisting of $C_1$–$C_4$-alkoxy, $C_1$–$C_{20}$-acyl, $C_1$–$C_6$-alkylaminooxy, and $C_1$–$C_6$-alkyloximo radicals, W is a radical B or hydrogen, m is 0, 1 or 2, n is an integer from 1 to 2000, a is an integer of at least 1, b is 0 or an integer from 1 to 2000, c is an integer from 1 to 30, and d is 0 or 1, with the proviso that, based on the sum of urethane groups and urea groups, at least 30 mol % of urethane groups are present.

2. The copolymer of claim 1, wherein n is an integer from 3 to 400.

3. The copolymer of claim 1, wherein a is an integer of not more than 10.

4. A silane-terminated polydiorganosiloxane-urethane copolymer of the formula 1,

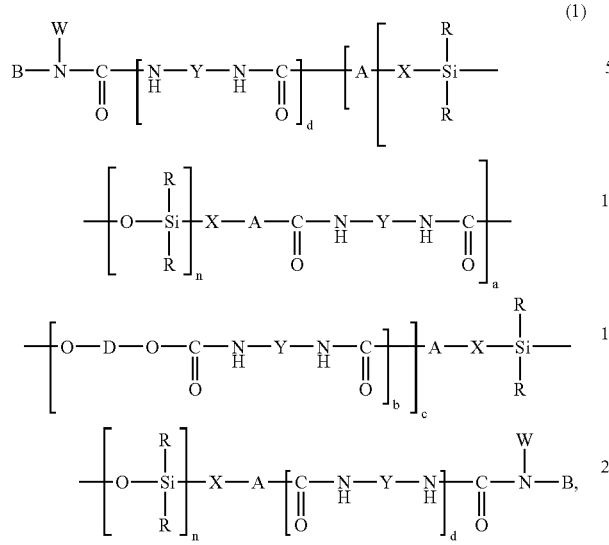

(1)

wherein R is a monovalent hydrocarbon radical optionally substituted by fluorine or chlorine and having 1 to 20 carbon atoms,
  X is an alkylene radical having 1 to 20 carbon atoms in which non-adjacent methylene units are optionally replaced by —O—,
  A is an oxygen atom or an amino group —NR'—,
  R' is hydrogen or an alkyl radical having 1 to 10 carbon atoms,
  Y is a hydrocarbon radical optionally substituted by fluorine or chlorine and having 1 to 20 carbon atoms,
  D is an alkylene radical optionally substituted by fluorine, chlorine, $C_1$–$C_6$-alkyl or $C_1$–$C_6$-alkyl ester and having 1 to 700 carbon atoms, in which non-adjacent methylene units are optionally replaced by —O—, —COO—, —OCO—, or —OCOO—,
  B is a radical of the formula 2

-Z-Si($R^1$)$_m$($R''$)$_{3-m}$,           (2), wherein
  Z is an alkylene radical having 1 to 10 carbon atoms,
  $R^1$ is a monovalent hydrocarbon radical optionally substituted by fluorine or chlorine and having 1 to 12 carbon atoms,
  R'' is a moisture-reactive radical selected from the group consisting of $C_1$–$C_4$-alkoxy, $C_1$–$C_{20}$-acyl, $C_1$–$C_6$-alkylaminooxy, and $C_1$–$C_6$-alkyloximo radicals,
  W is a radical B or hydrogen,
  m is 0, 1 or 2,
  n is an integer from 1 to 2000,
  a is an integer of at least 1,
  b is 0 or an integer from 1 to 2000,
  c is an integer from 1 to 30, and
  d is 0 or 1,
with the proviso that, based on the sum of urethane groups and urea groups, at least 30 mol % of urethane groups are present wherein b is 0.

5. The copolymer of claim 1, wherein Y is an alkylene radical.

6. The copolymer of claim 1, containing, based on the sum of the urethane groups and urea groups, at least 50 mol % of urethane groups.

7. The copolymer of claim 1, wherein A is an oxygen atom.

8. A process for preparing the copolymer of claim 1, wherein aminoalkyl- or hydroxyalkyl-terminated polydiorganosiloxanes of the general formula 3

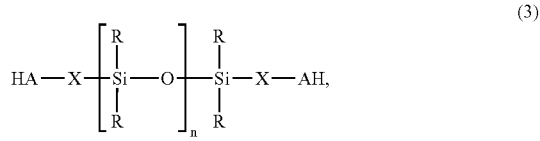

are reacted with diisocyanates of the general formula 4

OCN—Y—NCO           (4), and silanes of the general formula 5

and, if b is at least 1, additionally with α,ω-OH-terminated alkylenes of the general formula 6

HO-D-OH           (6), where
  p is 1, and
  E is an isocyanate group or an amino group —NHR''', in which R''' is hydrogen or a monovalent hydrocarbon radical optionally substituted by fluorine or chlorine and having 1 to 12 carbon atoms, or
  p is 2 and
  E is an —NH radical.

9. A process for preparing a copolymer of the formula 1

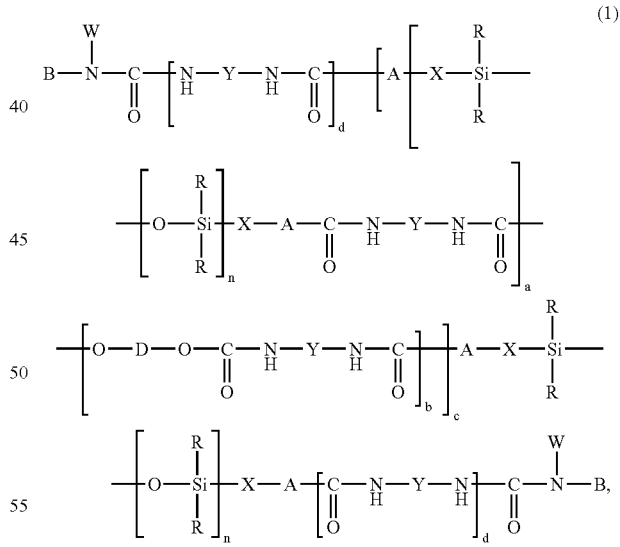

(1)

wherein R is a monovalent hydrocarbon radical optionally substituted by fluorine or chlorine and having 1 to 20 carbon atoms,
  wherein R is a monovalent hydrocarbon radical optionally substituted by fluorine or chlorine and having 1 to 20 carbon atoms,
  X is an alkylene radical having 1 to 20 carbon atoms in which non-adjacent methylene units are optionally replaced by —O—, A is an oxygen atom or an amino group —NR'—, R' is hydrogen or an alkyl radical having 1 to 10 carbon atoms, Y is a hydrocarbon radical optionally substituted by fluorine or chlorine and having 1 to 20 carbon atoms, D is an alkylene radical optionally substituted by fluorine, chlorine, $C_1$–$C_6$-alkyl or $C_1$–$C_6$-alkyl ester and having 1 to 700 carbon atoms, in which non-adjacent methylene units are optionally replaced by —O—, —COO—, —OCO—, or —OCOO—, B is a radical of the formula 2

$$-Z-Si(R^1)_m(R'')_{3-m}, \qquad (2),$$

wherein

Z is an alkylene radical having 1 to 10 carbon atoms, $R^1$ is a monovalent hydrocarbon radical optionally substituted by fluorine or chlorine and having 1 to 12 carbon atoms, R'' is a moisture-reactive radical selected from the group consisting of $C_1$–$C_4$-alkoxy, $C_1$–$C_{20}$-acyl, $C_1$–$C_6$-alkylaminooxy, and $C_1$–$C_6$-alkyloximo radicals, W is a radical B or hydrogen, m is 0, 1 or 2, n is an integer from 1 to 2000, a is an integer of at least 1, b is 0 or an integer from 1 to 2000, c is an integer from 1 to 30, and d is 0 or 1, with the proviso that, based on the sum of urethane groups and urea groups, at least 30 mol % of urethane groups are present, wherein aminoalkyl- or hydroxyalkyl-terminated polydiorganosiloxanes of the general formula 3

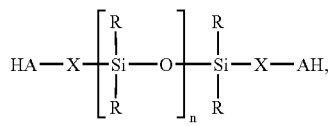
(3)

are reacted with diisocyanates of the general formula 4

$$OCN—Y—NCO \qquad (4),$$

and silanes of the general formula 5

$$E[-Z-Si(R^1)_m(R'')_{3-m}]_p \qquad (5),$$

and, if b is at least 1, additionally with α,ω-OH-terminated alkylenes of the general formula 6

$$HO-D-OH \qquad (6),$$

where p is 1, and

E is an isocyanate group.

10. A moisture-curing composition, comprising at least one copolymer of claim 1.

11. An adhesive, comprising at least one copolymer of claim 1.

12. A thermoplastic elastomer, comprising as at least one component thereof, a copolymer of claim 1.

13. A vulcanizable elastomer composition, comprising as at least one component thereof, a copolymer of claim 1.

14. In a polymer blend containing a curable additive, the improvement comprising selecting as at least one curable additive, a copolymer of claim 1.

15. A coating, comprising a copolymer of claim 1 or a cured reaction product thereof.

16. A biocompatible material comprising a copolymer of claim 1 or a cured reaction product thereof.

17. The process of claim 8, which is conducted in the absence of water.

18. The process of claim 8, which is conducted in the absence of solvent.

19. The process of claim 8, which is conducted both in the absence of solvent and of water.

20. The process of claim 8, wherein the copolymer is a liquid.

21. The copolymer of claim 1, which is a liquid.

* * * * *

UNITED STATES PATENT AND TRADEMARK OFFICE
CERTIFICATE OF CORRECTION

PATENT NO. : 7,060,760 B2  
APPLICATION NO. : 10/471955  
DATED : June 13, 2006  
INVENTOR(S) : Wolfram Schindler et al.

Page 1 of 4

It is certified that error appears in the above-identified patent and that said Letters Patent is hereby corrected as shown below:

Column 11, Line 60, Claim 1:  
(Page 2, Line 3, Claim 11: Amendment dated November 18, 2005):

Delete:

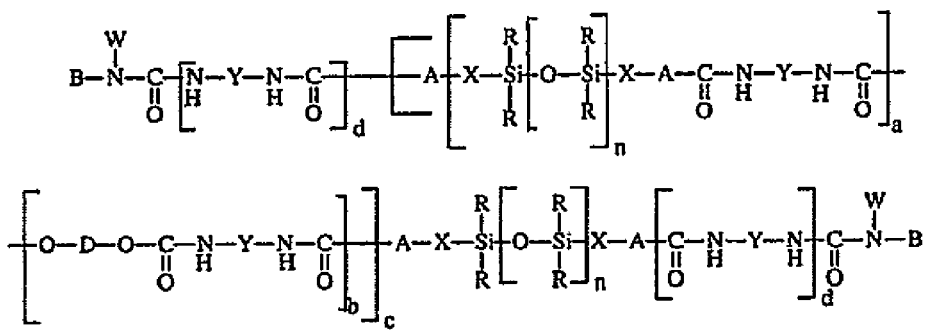

and insert therefor --

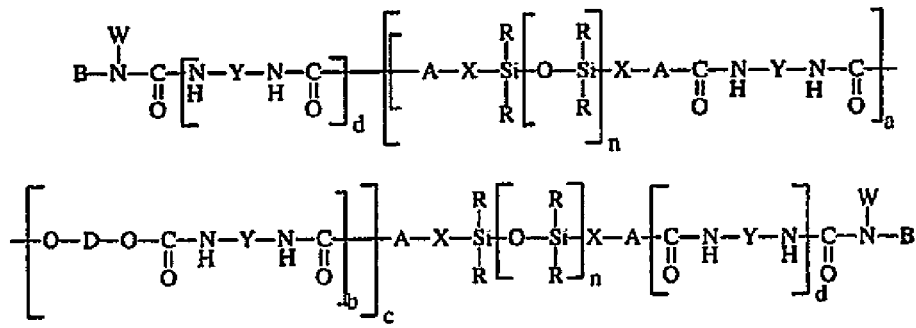

UNITED STATES PATENT AND TRADEMARK OFFICE
CERTIFICATE OF CORRECTION

PATENT NO. : 7,060,760 B2
APPLICATION NO. : 10/471955
DATED : June 13, 2006
INVENTOR(S) : Wolfram Schindler et al.

It is certified that error appears in the above-identified patent and that said Letters Patent is hereby corrected as shown below:

Column 3, Line 5, Claim 4:
(Page 4, Line 3, Claim 14: Amendment dated November 18, 2005):

Delete:

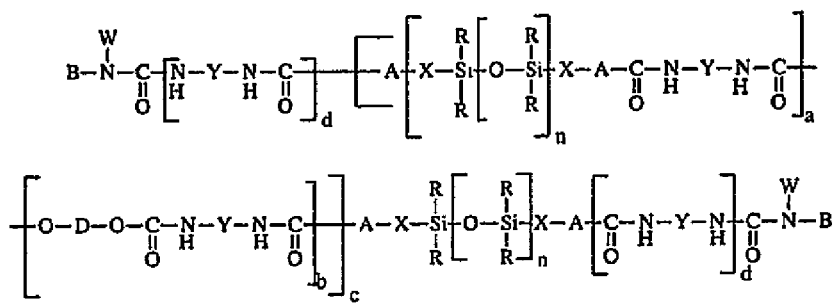

and insert therefor:

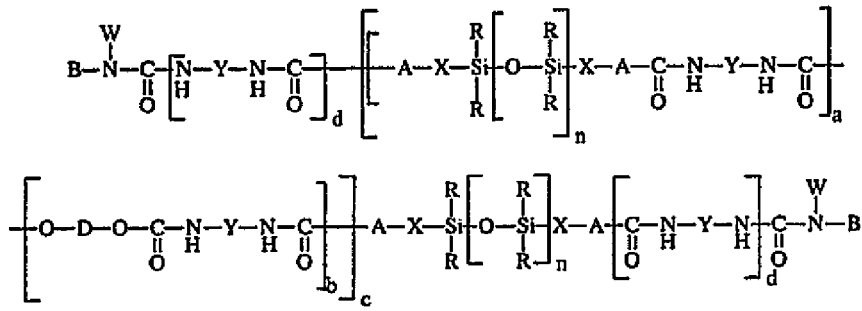

UNITED STATES PATENT AND TRADEMARK OFFICE
CERTIFICATE OF CORRECTION

PATENT NO.         : 7,060,760 B2                                    Page 3 of 4
APPLICATION NO. : 10/471955
DATED              : June 13, 2006
INVENTOR(S)        : Wolfram Schindler et al.

It is certified that error appears in the above-identified patent and that said Letters Patent is hereby corrected as shown below:

Column 14, Line 40, Claim 9:
(Page 7, Line 1, Claim 19: Amendment dated November 18, 2005):

Delete:

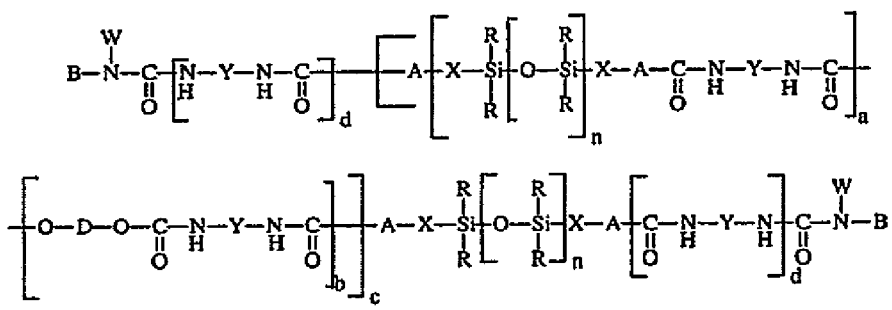

and insert therefor:

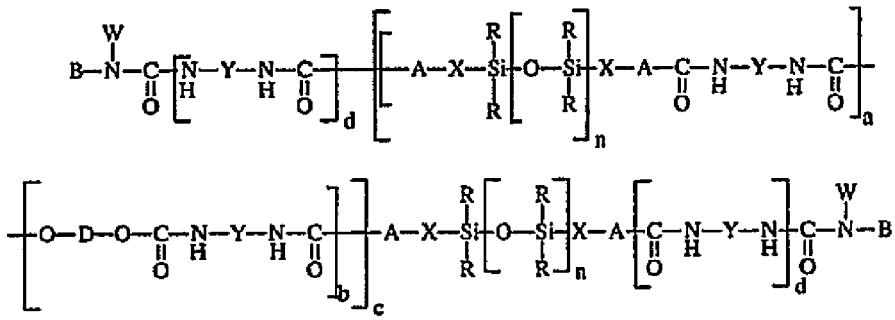

UNITED STATES PATENT AND TRADEMARK OFFICE
CERTIFICATE OF CORRECTION

PATENT NO. : 7,060,760 B2
APPLICATION NO. : 10/471955
DATED : June 13, 2006
INVENTOR(S) : Wolfram Schindler et al.

It is certified that error appears in the above-identified patent and that said Letters Patent is hereby corrected as shown below:

Column 14, Line 62, Claim 9:
(Page 7, Line 5, Claim 19: Amendment dated November 18, 2005):

Delete: "wherein R is a monvalent . . . 1 to 20 carbon atoms" (second occurrence).

Signed and Sealed this

Sixteenth Day of January, 2007

JON W. DUDAS
*Director of the United States Patent and Trademark Office*